United States Patent [19]

Boles et al.

[11] Patent Number: 4,476,931

[45] Date of Patent: Oct. 16, 1984

[54] WATER CONTROL WELL TREATING SOLUTION AND METHOD

[75] Inventors: Joel L. Boles, Forney; Gene Mancillas, Arlington, both of Tex.

[73] Assignee: Hughes Tool Company, Houston, Tex.

[21] Appl. No.: 419,294

[22] Filed: Sep. 17, 1982

[51] Int. Cl.³ .......................................... E21B 33/138
[52] U.S. Cl. ............................. 166/294; 166/305 R; 523/130
[58] Field of Search ........................... 166/294, 305 R

[56] References Cited

U.S. PATENT DOCUMENTS

| | | | |
|---|---|---|---|
| 2,779,418 | 1/1957 | Garst | 166/305 R |
| 2,874,779 | 2/1959 | Johnson, Jr. | 166/305 R |
| 3,308,885 | 3/1967 | Sandiford | 166/305 R X |
| 3,721,295 | 3/1973 | Bott | 166/294 X |
| 3,730,271 | 5/1973 | Gall | 166/294 |
| 3,830,302 | 8/1974 | Dreher et al. | 166/294 |
| 3,943,996 | 3/1976 | Guilbault et al. | 523/130 X |
| 3,981,363 | 9/1976 | Gall | 166/270 |
| 4,039,029 | 8/1977 | Gall | 166/294 |
| 4,222,881 | 9/1980 | Byham et al. | 523/130 X |
| 4,425,242 | 1/1984 | Penny et al. | 166/305 R X |

*Primary Examiner*—George A. Suchfield
*Attorney, Agent, or Firm*—Robert A. Felsman; Charles D. Gunter, Jr.

[57] ABSTRACT

A well treating solution is shown for changing the relative permeability of a formation being treated to water. The solution is made by mixing an amphoteric polymeric material, a mutual solvent and a surface active agent in a brine carrier liquid. The well treating solution is injected into the formation at pump rates below the fracture gradient of the formation. The well is briefly shut-in, after which production can be resumed. The treating solution and method taught lower the permeability of the producing formation to water without substantially affecting the formation's permeability to oil and gas.

10 Claims, No Drawings

WATER CONTROL WELL TREATING SOLUTION AND METHOD

BACKGROUND OF THE INVENTION

The present invention relates generally to well treating solutions for changing the relative permeability of a formation being treated to water and, more specifically, to a well treating solution for reducing water production problems on producing oil and gas wells.

Many oil producing zones have variable permeability both vertically and horizontally. In zones where permeability stratification exists, the displacing water used in producing oil sweeps fastest through the more permeable zones so that much of the oil in the less permeable zones must be produced at high water-oil ratios. Production of unwanted water has consistently burdened the industry since the cost of lifting, separating, and disposing of produced water makes it less profitable to produce oil. In the past, it has been stated that many oil wells produce a gross effluent comprising 80 to 98 percent by volume water and only 2 to 20 percent by volume of oil. Because of this, most of the pumping energy expended in producing a well is spent in lifting water from the well. The additional expense of separating and disposing of separated foul water continues to rise, especially in view of increasing environmental concerns. Similar problems exist with producing gas wells.

Prior attempts to reduce water production in producing oil and gas wells have included the injection into the formation of an aqueous solution thickened with a gelling polymer followed by a cross-linking ionic solution used to further cross-link the polymer. Inert materials such as ground walnut hulls, asbestos, or the like were sometimes added to the polymer solutions to act as a filler for a filter cake to lower the rate of water production. Other prior techniques included forming solid "plugs" within the formation to control water flow.

One problem with the prior techniques has been that polymeric solutions that have cross-linked sufficiently to form a gel are difficult to circulate or to inject into an undergound formation with sufficient penetration to achieve adequate results. The cross-linked polymeric systems were complicated to use and required close timing to achieve adequate gellation without exceeding the available pumping power of the injection unit. Certain of the prior materials have been extremely shear sensitive. Other prior materials have been ineffective because of toxicity problems of the material utilized.

SUMMARY OF THE INVENTION

There exists a need, therefore, for a treating solution for changing the relative permeability of a formation being treated to water which will reduce the water permeability of the formation without substantially affecting the permeability of the formation to oil or gas.

There also exists a need for a treating solution which will deeply penetrate the formation matrix at pumping rates and treating pressures which do not exceed the fracturing gradient of the formation.

The well treating solution of the present invention comprises an amphoteric polymeric material and a liquid carrier for the polymeric material. The amphoteric polymeric material is preferably a terpolymer made up of an anionic, a cationic, and a nonionic monomers. Preferably the amphoteric polymeric material is made by polymerizing acrylic acid, acrylamide, and dimethyl diallyl ammonium chloride monomers.

A well treating solution can be prepared for changing the relative permeability of a formation being treated by combining the amphoteric polymeric material with a mutual solvent, preferably butyl cellosolve, and a surface active agent. The polymer, mutual solvent and surface active agent are added to a liquid carrier, normally a clean brine.

In the method of the invention, the formation is first preflushed with oil containing a surface active agent, in the case of an oil formation being treated, or with a brine containing a surface active agent in the case of a gas formation being treated. The preflushed formation is then injected with a treating solution comprising an amphoteric polymeric material, a mutual solvent, a surface active agent, and a liquid carrier. The formation is then overflushed with a brine solution after which production is resumed.

Additional objects, features, and advantages will be apparent in the written description which follows.

DETAILED DESCRIPTION OF THE INVENTION

The present well treating solution for changing the relative permeability of a formation includes an amphoteric polymeric material and a liquid carrier for the amphoteric polymeric material. The amphoteric polymeric material is simply mixed with the liquid carrier and injected at pumping rates and treating pressures not to exceed the fracturing pressure of the formation being treated. The carrier liquid is preferably water and most preferably is a clean brine to avoid damage to water sensitive clay formations. A 2% KCl brine has been found to work well as the carrier liquid.

The amphoteric polymeric material is characterized by the presence of both positively and negatively charged components along the polymer chain. This nature of the polymeric material is believed to account for the polymeric material's ability to strongly bond to the formation while exhibiting a hydrophilic character capable of forming a strong hydrogen bond to water causing a drag or a higher friction pressure on water flowing through the capillaries or openings of the formation. By whatever mechanism, the mobility of formation water is greatly reduced by the amphoteric polymeric material without restricting the production of oil or gas to any appreciable extent.

The preferred amphoteric polymeric material is a terpolymer synthesized from an anionic monomer, a cationic monomer, and a neutral or non-ionic monomer. The monomers employed are preferably selected to have similar reactivities so that the resultant amphoteric polymeric material has a random distribution of monomers. Suitable anionic monomers capable of being polymerized to form the amphoteric polymeric material include acrylic acid, methacrylic acid, 2-acrylamide-2-methylpropane sulfonic acid, maleic anhydride and the like. Suitable cationic monomers capable of being polymerized include dimethyl-diallyl ammonium chloride, dimethylamino-ethyl methacrylate, allyltrimethyl ammonium chloride, and the like. Suitable non-ionic or neutral monomers include butadiene, N-vinyl-2-pyrrolidone, methyl vinyl ether, methyl acrylate, maleic anhydride, styrene, vinyl acetate, acrylamide, methyl methacrylate, and acrylonitrile.

The preferred amphoteric polymeric material is a terpolymer made by polymerizing acrylic acid (AA), acrylamide (AM), and a quarternary ammonium compound, dimethyl diallyl ammonium chloride (DMDAC). The amphoteric polymeric material is preferably polymerized by reacting the constituent monomers in an approximate 1:1:1 weight ratio.

The most preferred amphoteric polymeric material includes approximately 30% polymerized AA, 40% polymerized AM, and 10% polymerized DMDAC with approximately 20% free residual DMDAC which is not polymerized due to lower relative reactivity of the DMDAC monomer. The structural formula for the preferred amphoteric polymeric material is shown in FIG. 1:

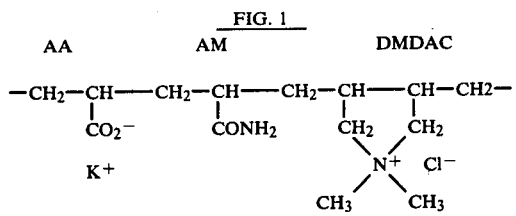

A well treating solution for practicing the present invention can be made by simply mixing the amphoteric polymeric material with a carrier liquid, which can conveniently be sweet or sour water. The well treating solution of the invention can also include a mutual solvent and a surface active agent to enhance the effect of the amphoteric polymeric material in strongly bonding to the formation and resisting the flow of water through the formation. The preferred mutual solvent is a glycol derivitive, ethylene glycol monobutyl ether commonly referred to as butyl cellosolve. Butyl cellosolve is commercially available and well known in the industry. The mutual solvent is used to clean and provide strong water-wetting properties to the formation to allow the amphoteric polymeric material to strongly absorb.

The surface active agent employed can be any of the commonly used surface active agents known in the industry which are used to aid the treating solution to wet and penetrate oily surfaces. The preferred surface active agent is a cationic perfluorated quaternary ammonium iodide surfactant which is effective to decrease the surface tension of the treating solution from about 70 dynes/cm to about 17-20 dynes/cm. In addition to aiding the treating solution in wetting and penetrating the formation, the use of a surfactant aids to improve fluid cleanup after the treatment is completed. Other surface active agents can be employed which are effective to lower the surface tension of the treating solution and leave the formation in a water wet condition. The choice of surfactant employed depends, in part, upon the type of formation being treated. For example, in sandstone formations, anionic or non-ionic surfactants are generally employed to water wet the formation. In limestone formations, cationic surfactants are generally preferred to water wet the formation. Some commercially available surfactants are effective to wet both types of formations. Preferably the surfactant should be effective to reduce the surface tension of the treating solution below about 50 dynes/cm and, most preferably, below about 25 dynes/cm.

A preferred well treating solution for changing the relative permeability of a formation to water can be prepared by adding the amphoteric polymeric material to a 2% KCl brine carrier liquid with the amphoteric polymeric material being present in the range of about 0.19% to 3% by volume, preferably 1.0% by volume of the treating solution. The mutual solvent is added in the range of about 5% to 20% by volume, preferably 10% by volume of treating solution. The surface active agent is added in the range of about 0.1% to 1.0% by volume, preferably about 0.2% by volume of treating solution.

After mixing the amphoteric polymeric material, mutual solvent and surface active agent with the 2% KCl brine, the resulting treating solution is injected into the formation at pumping rates and treating pressures below the fracture gradient of the formation. The volume of treating solution used is based on the intended treatment radius from the wellbore, the thickness of the zone to be treated, the porosity of the formation being treated and other factors. Normally, treatments are designed for radial penetration of 5 to 7 feet from the well bore which covers a range of about 60 to 300 gallons of well treating solution per lineal foot of well section treated.

The preferred method of treating a formation to lower the relative permeability of the formation being treated to water comprises the following steps:

OIL WELLS

The formation to be treated is first preflushed with diesel or clean oil containing approximately 1% by volume of preflush solution of an anionic sulfonated surface active agent. The preflush serves to prepare the formation for the well treating solution of the invention by cleaning the formation. Treating volumes of 25 to 50 gallons of preflush solution per lineal foot of well section treated have been found to be acceptable. The volume should not, however, be less than about 500 gallons total. The preflush is injected at less than the fracture gradient of the formation.

The well treating solution is then injected immediately after the preflush solution. The volume of well treating solution utilized is based upon the intended treatment radius, the porosity of the formation and other factors, as has been discussed and will generally range from about 60 to 300 gallons per lineal foot of well section treated.

The well treating solution is followed with an overflush of clean 2% KCl brine. Treating volumes of 25 to 50 gallons per lineal foot of well section have been found to be acceptable.

The well is then shut-in for at least about 2 hours after which it can be placed back on production.

GAS WELLS

The preferred method for treating gas wells is identical to the procedure described for oil wells with the exception that a clean 2% KCl brine preflush containing 0.2% by volume of preflush solution of a cationic perfluorated quaternary ammonium iodide surfactant is used instead of the oil preflush described above. The brine preflush is used in gas wells because the use of oil in a dry gas well will increase the oil saturation in the formation and reduce the relative permeability of the formation to gas.

The well treating solution and method described above have been used successfully in actual well treatment jobs as exemplified by the following case histories:

Alberta, Canada

This well was completed in the Granite Wash Formation to a depth below 4908 feet and, prior to treatment, was producing approximately 22 barrels of oil per day and approximately 53 barrels of water per day. The Granite Wash Formation is a sandstone formation which contains some clays. The porosity of the formation is about 15% and the permeability ranges from about 20 to 30 md.

The well treating method of the invention was performed on the well using 2250 gallons of well treating solution injected at a pressure under the fracture gradient of the formation. After the treatment, water production dropped from 53 to 34 barrels of water per day and the oil production increased from 22 to 41 barrels of oil per day. Six months after the treatment, the well was still producing at the new rates.

Jack County, Tex.

This well was completed in a 50 foot interval of the Marble Falls Conglomerate and was producing 500,000 cubic feet per day of gas and 185 barrels of water per day. The formation was a micritic limestone with a permeability in the range of 0.1 to 1.0 md. and a porosity in the range of 3% to 4%. The formation was also water sensitive due to the presence of clay minerals.

The well treating method of the invention was performed on the well using 2000 gallons of well treating solution pumped at $\frac{1}{2}$ to 1 barrel per minute. After the treatment, the well was producing 10 barrels of water per day, 2 barrels of oil per day and 1.3 million cubic feet of gas per day.

Ward County, Tex.

This well was completed in the Rustler Dolomite formation below 1742 feet and was producing 7 barrels of oil per day and 65 barrels of water per day prior to treatment. The formation is a dirty dolomite that contains some limestone and quartz grains and shows a good porosity and permeability.

The well treating method of the invention was performed on the well using 5000 gallons of well treating solution injected at 1 to 2 barrels per minute. After treatment, the water production dropped from 65 to 37 barrels per day and the oil production increased from 7 to 11 barrels per day.

Live Oak County, Tex.

This well was completed in the Wilcox Formation below 6259 feet and was producing only water at 300 barrels of water per day. The Wilcox Formation is a shaly, silty sandstone containing water sensitive clays. The porosity is about 22% and the permeability is about 0.1 md.

The well treating method of the invention was performed on the well using 2000 gallons of well treating solutions pumped down a $2\frac{7}{8}$ inch tubing at pressures ranging from 1500–1700 psi. Treatment injection rates were maintained in the range of $\frac{1}{4}$ to $\frac{3}{4}$ barrels per minute. After treatment, the well was shut-in for four hours and then allowed to flow back overnight. Oil production fluctuated over a two week period finally stabilizing at 56 barrels of oil per day, 76,000 cubic feet per day of gas and 166 barrels of water per day. After four months, the well was still producing at the new levels.

An invention has been provided with significant advantages. The well treating solution and method reduce the rate of water production from oil and gas wells while oil and gas permeability of the formation remains relatively unchanged. The treatment is effective for reducing high water production problems on oil and gas wells on all types of formations. The treating fluid is not shear sensitive at the pump rates utilized and is usable over a wide temperature range. The treating solution has a low surface tension (19–20 dynes/cm) to penetrate the formation and improve clean-up after the job. Long shut-in times are not required and a typical shut-in ranges from 2 to 4 hours. The well treating fluid is compatible with most multivalent cations and most other commonly encountered chemical additives. The well treating solution can be used to combat a variety of related water production problems such as fingering, coning, and early breakthrough during flooding programs.

While the invention has been shown in only one of its forms, it is not thus limited but is susceptible to various changes and modifications without departing from the spirit thereof.

We claim:

1. A method of treating an oil well formation to lower the relative permeability of the formation being treated to water, comprising the steps of:
   preflushing the formation with oil containing a surface active agent;
   injecting a treating solution immediately after the preflush, said treating solution comprising an amphoteric polymeric material, a mutual solvent, a surface active agent, and a liquid carrier; and
   overflushing the formation with water.

2. The method of claim 1, wherein said amphoteric polymeric material is made by polymerizing acrylic acid, acrylamide, and dimethyl diallyl ammonium chloride monomers.

3. The method of claim 1, wherein said mutual solvent is ethylene glycol monobutyl ether.

4. The method of claim 1, wherein said treating solution surface active agent is a perfluorated quaternary ammonium iodide surfactant.

5. The method of claim 1, wherein said liquid carrier is salt water.

6. A method of treating a gas well formation to lower the relative permeability of the formation being treated to water, comprising the steps of:
   preflushing the formation with water containing a surface active agent;
   injecting a treating solution immediately after the preflush, said treating solution comprising an amphoteric polymeric material, a mutual solvent, a surface active agent, and a liquid carrier; and
   overflushing the formation with water.

7. The method of claim 6, wherein said amphoteric polymeric material is made by polymerizing acrylic acid, acrylamide, and dimethyl diallyl ammonium chloride monomers.

8. The method of claim 6, wherein said mutual solvent is ethylene glycol monobutyl ether.

9. The method of claim 6, wherein said treating solution surface active agent is a prefluorated quaternary ammonium iodide surfactant.

10. The method of claim 6, wherein said liquid carrier is salt water.

* * * * *